United States Patent
Vesely et al.

(10) Patent No.: US 7,796,134 B2
(45) Date of Patent: Sep. 14, 2010

(54) MULTI-PLANE HORIZONTAL PERSPECTIVE DISPLAY

(75) Inventors: Michael A. Vesely, Santa Cruz, CA (US); Nancy L. Clemens, Santa Cruz, CA (US)

(73) Assignee: Infinite Z, Inc., Campbell, CA (US)

( * ) Notice: Subject to any disclaimer, the term of this patent is extended or adjusted under 35 U.S.C. 154(b) by 1057 days.

(21) Appl. No.: 11/141,649

(22) Filed: May 31, 2005

(65) Prior Publication Data

US 2005/0264858 A1 Dec. 1, 2005

Related U.S. Application Data

(60) Provisional application No. 60/576,187, filed on Jun. 1, 2004, provisional application No. 60/576,189, filed on Jun. 1, 2004, provisional application No. 60/576,182, filed on Jun. 1, 2004, provisional application No. 60/576,181, filed on Jun. 1, 2004.

(51) Int. Cl.
*G06T 15/10* (2006.01)

(52) U.S. Cl. .................................. 345/427; 345/1.1

(58) Field of Classification Search ........... 345/1.1–1.3, 345/427
See application file for complete search history.

(56) References Cited

U.S. PATENT DOCUMENTS

| | | | |
|---|---|---|---|
| 1,592,034 A | 7/1926 | Macy et al. | |
| 4,182,053 A | 1/1980 | Allen et al. | |
| 4,291,380 A | 9/1981 | Rohner | |
| 4,677,576 A | 6/1987 | Berlin, Jr. et al. | |
| 4,763,280 A | 8/1988 | Robinson et al. | |
| 4,795,248 A | 1/1989 | Okada et al. | |
| 4,984,179 A | 1/1991 | Waldern et al. | |
| 5,079,699 A | 1/1992 | Tuy et al. | |
| 5,168,531 A | 12/1992 | Sigel | |
| 5,264,964 A | 11/1993 | Faris | |
| 5,276,785 A | 1/1994 | Mackinlay et al. | |
| 5,287,437 A | 2/1994 | Deering | |
| 5,327,285 A | 7/1994 | Faris | |
| 5,361,386 A | 11/1994 | Watkins et al. | |
| 5,381,127 A | 1/1995 | Kheiu | |
| 5,381,158 A | 1/1995 | Takahara et al. | |
| 5,400,177 A | 3/1995 | Petitto et al. | |
| 5,438,623 A | 8/1995 | Begault | |

(Continued)

OTHER PUBLICATIONS

Agrawala, M., et al., Proceedings of the 24th annual conference on Computer Graphics and Interactive Techniques, ACM Press/Addison-Wesley Publishing Co., 1997, The two-user Responsive Workbench: support for collaboration through individual views of a shared space, pp. 327-332.

(Continued)

*Primary Examiner*—Xiao M Wu
*Assistant Examiner*—Charles Tseng
(74) *Attorney, Agent, or Firm*—Fish & Richardson P.C.

(57) ABSTRACT

The present invention multi-plane display system discloses a three dimension display system comprising at least two display surfaces, one of which displaying a three dimensional horizontal perspective images. Further, the display surfaces can have a curvilinear blending display section to merge the various images. The multi-plane display system can comprise various camera eyepoints, one for the horizontal perspective images, and optionally one for the curvilinear blending display surface.

18 Claims, 14 Drawing Sheets

U.S. PATENT DOCUMENTS

| | | | |
|---|---|---|---|
| 5,515,079 | A | 5/1996 | Hauck |
| 5,537,144 | A | 7/1996 | Faris |
| 5,559,937 | A * | 9/1996 | Takeda ........................ 345/627 |
| 5,574,835 | A * | 11/1996 | Duluk et al. ................. 345/421 |
| 5,574,836 | A | 11/1996 | Broemmelsiek |
| 5,652,617 | A | 7/1997 | Barbour |
| 5,686,975 | A | 11/1997 | Lipton |
| 5,696,892 | A | 12/1997 | Redmann et al. |
| 5,745,164 | A | 4/1998 | Faris |
| 5,795,154 | A | 8/1998 | Woods |
| 5,844,717 | A | 12/1998 | Faris |
| 5,862,229 | A | 1/1999 | Shimizu |
| 5,880,733 | A | 3/1999 | Horvitz et al. |
| 5,945,985 | A | 8/1999 | Babin et al. |
| 5,956,046 | A | 9/1999 | Kehlet et al. |
| 6,028,593 | A | 2/2000 | Rosenberg et al. |
| 6,034,717 | A | 3/2000 | Dentinger et al. |
| 6,064,354 | A | 5/2000 | DeLuca |
| 6,069,649 | A | 5/2000 | Hattori |
| 6,072,495 | A | 6/2000 | Watanabe et al. |
| 6,100,903 | A | 8/2000 | Goettsche |
| 6,108,005 | A | 8/2000 | Starks et al. |
| 6,115,022 | A * | 9/2000 | Mayer et al. ................. 345/418 |
| 6,139,434 | A | 10/2000 | Miyamoto et al. |
| 6,163,336 | A | 12/2000 | Richards |
| 6,195,205 | B1 | 2/2001 | Faris |
| 6,198,524 | B1 | 3/2001 | Osgood |
| 6,208,346 | B1 | 3/2001 | Washio et al. |
| 6,211,848 | B1 | 4/2001 | Plesniak et al. |
| 6,226,008 | B1 | 5/2001 | Watanabe et al. |
| 6,241,609 | B1 | 6/2001 | Rutgers |
| 6,252,707 | B1 | 6/2001 | Kleinberger et al. |
| 6,317,127 | B1 | 11/2001 | Daily et al. |
| 6,346,938 | B1 | 2/2002 | Chan et al. |
| 6,351,280 | B1 | 2/2002 | Benton |
| 6,373,482 | B1 | 4/2002 | Migdel et al. |
| 6,384,971 | B1 | 5/2002 | Faris |
| 6,392,689 | B1 | 5/2002 | Dolgoff |
| 6,452,593 | B1 | 9/2002 | Challener |
| 6,478,432 | B1 | 11/2002 | Dyner |
| 6,529,210 | B1 | 3/2003 | Rees |
| 6,556,197 | B1 | 4/2003 | Van Hook et al. |
| 6,593,924 | B1 | 7/2003 | Lake et al. |
| 6,614,427 | B1 | 9/2003 | Aubrey |
| 6,618,049 | B1 | 9/2003 | Hansen |
| 6,643,124 | B1 | 11/2003 | Wilk |
| 6,680,735 | B1 | 1/2004 | Seller et al. |
| 6,690,337 | B1 | 2/2004 | Mayer et al. |
| 6,715,620 | B2 | 4/2004 | Taschek |
| 6,898,307 | B1 | 5/2005 | Harrington |
| 6,912,490 | B2 | 6/2005 | Dodge |
| 6,943,754 | B2 | 9/2005 | Aughey et al. |
| 6,956,576 | B1 | 10/2005 | Deering et al. |
| 6,987,512 | B2 | 1/2006 | Robertson et al. |
| 7,102,635 | B2 | 9/2006 | Shih et al. |
| 2002/0041327 | A1 | 4/2002 | Hildreth |
| 2002/0080094 | A1 | 6/2002 | Biocca et al. |
| 2002/0113752 | A1 | 8/2002 | Sullivan et al. |
| 2002/0140698 | A1 | 10/2002 | Robertson et al. |
| 2002/0163482 | A1 | 11/2002 | Sullivan |
| 2002/0174121 | A1 | 11/2002 | Clemie |
| 2002/0176636 | A1 | 11/2002 | Shefi |
| 2002/0180727 | A1* | 12/2002 | Guckenberger et al. ..... 345/418 |
| 2002/0186221 | A1 | 12/2002 | Bell |
| 2002/0190961 | A1 | 12/2002 | Chen |
| 2003/0006943 | A1 | 1/2003 | Sato et al. |
| 2003/0011535 | A1 | 1/2003 | Kukuchi et al. |
| 2003/0085866 | A1 | 5/2003 | Bimber et al. |
| 2003/0085896 | A1 | 5/2003 | Freeman |
| 2003/0227470 | A1 | 12/2003 | Genc et al. |
| 2003/0231177 | A1 | 12/2003 | Montagnese et al. |
| 2004/0037459 | A1 | 2/2004 | Dodge |
| 2004/0066376 | A1 | 4/2004 | Donath et al. |
| 2004/0066384 | A1 | 4/2004 | Ohba |
| 2004/0125103 | A1 | 7/2004 | Kaufman et al. |
| 2004/0130525 | A1 | 7/2004 | Suchocki |
| 2004/0135744 | A1 | 7/2004 | Bimber et al. |
| 2004/0135780 | A1 | 7/2004 | Nims |
| 2004/0164956 | A1 | 8/2004 | Yamaguchi et al. |
| 2004/0169649 | A1 | 9/2004 | Suzuki |
| 2004/0196359 | A1 | 10/2004 | Blackham |
| 2004/0208358 | A1 | 10/2004 | Tooyama et al. |
| 2004/0227703 | A1 | 11/2004 | Lamvik et al. |
| 2004/0249303 | A1 | 12/2004 | Serra |
| 2005/0024331 | A1 | 2/2005 | Berkley et al. |
| 2005/0030308 | A1 | 2/2005 | Takaki |
| 2005/0057579 | A1 | 3/2005 | Young |
| 2005/0093859 | A1 | 5/2005 | Sumanaweera et al. |
| 2005/0093876 | A1 | 5/2005 | Snyder et al. |
| 2005/0151742 | A1 | 7/2005 | Hong et al. |
| 2005/0156881 | A1 | 7/2005 | Trent et al. |
| 2005/0162447 | A1 | 7/2005 | Tiggs |
| 2005/0219240 | A1 | 10/2005 | Vesely et al. |
| 2005/0219693 | A1 | 10/2005 | Harktop et al. |
| 2005/0219694 | A1 | 10/2005 | Vesely et al. |
| 2005/0219695 | A1 | 10/2005 | Vesely et al. |
| 2005/0231532 | A1 | 10/2005 | Suzuki et al. |
| 2005/0248566 | A1 | 11/2005 | Vesely et al. |
| 2005/0264558 | A1 | 12/2005 | Vesely et al. |
| 2005/0264559 | A1 | 12/2005 | Vesely et al. |
| 2005/0264857 | A1 | 12/2005 | Vesely et al. |
| 2005/0275913 | A1 | 12/2005 | Vesely et al. |
| 2005/0275914 | A1 | 12/2005 | Vesely et al. |
| 2005/0275915 | A1 | 12/2005 | Vesely et al. |
| 2005/0281411 | A1 | 12/2005 | Vesely et al. |
| 2006/0126926 | A1 | 6/2006 | Vesely et al. |
| 2006/0126927 | A1 | 6/2006 | Vesely et al. |
| 2006/0170652 | A1 | 8/2006 | Bannai et al. |
| 2006/0221071 | A1 | 10/2006 | Vesely et al. |
| 2006/0227151 | A1 | 10/2006 | Bannai |
| 2006/0250390 | A1 | 11/2006 | Vesely et al. |
| 2006/0250391 | A1 | 11/2006 | Vesely et al. |
| 2006/0250392 | A1 | 11/2006 | Vesely et al. |
| 2006/0252978 | A1 | 11/2006 | Vesely et al. |
| 2006/0252979 | A1 | 11/2006 | Vesely et al. |
| 2007/0035511 | A1 | 2/2007 | Banerjee et al. |
| 2007/0040905 | A1 | 2/2007 | Vesely et al. |
| 2007/0043466 | A1 | 2/2007 | Vesely et al. |
| 2007/0109296 | A1 | 5/2007 | Sakagawa et al. |

OTHER PUBLICATIONS

Arvo, J., et al., Responsive Workbench: Algorithms and Methodologies [online], California Institute of Technology, Aug. 1998, [retrieved on Aug. 17, 2007]. Retrieved from the Internet:<URL:http://www.gg.caltech.edu/workbench/intro.html>.

Beardsley, P., Important concepts from projective geometry [online], University of Edinburgh, Jan. 1995, [retrieved on Sep. 24, 2007]. Retrieved from the Internet:<URL:http://homepages.inf.ed.ac.uk/rbf/CVonline/LOCAL_COPIES/BEARDSLEY/beardsley.html>.

Cutler, L., et al., Proceedings of the 1997 symposium on Interactive 3D graphics, ACM, 1997, Two-handed direct manipulation on the responsive workbench, pp. 107-114.

Frohlich, B., et al., (stills from video) Physically-based manipulation on the responsive workbench [online], Standford University, Jan. 2000, [retrieved on Dec. 19, 2007]. Retrieved from the Internet:<URL:http://graphics.standford.edu/papers/physwrkbnch/yr2000.gt>.

Frohlich, B., et al., Computers in Biology and Medicine, Elsevier Science, Mar. 1995, The Responsive Workbench: A virtual working environment for physicians, vol. 25 No. 2, pp. 301-308.

Frohlich, B., et al., Virtual Reality, 2000. Proceedings, IEEE, Jan. 2000, Physically-based manipulation on the responsive workbench, Issue 2000, pp. 5-11.

Girling, A., Stereoscopic Drawing A Theory of 3-D Vision and its application to Stereoscopic Drawing, Arthur N. Girling, UK, 1990, Free Standing Projection, Chap. 2, pp. 19-28.

Hanrahan, P., et al., The Responsive Workbench [online], Stanford University, Nov. 1996, [retrieved on Aug. 17, 2007]. Retrieved from the Internet:<URL:http://www-graphics.stanford.edu/~hanrahan/talks/rwb/slides/>.

United States Searching Authority; International Search Report for PCT/US2005/011252; May 30, 2006; US.

United States Searching Authority; International Search Report for PCT/US2005/011253; Jun. 2, 2006; US.

United States Searching Authority; International Search Report for PCT/US2005/011254; Mar. 26, 2007; US.

United States Searching Authority; International Search Report for PCT/US2005/011255; Mar. 2, 2006; US.

United States Searching Authority; International Search Report for PCT/US2005/019068; Feb. 27, 2006; US.

United States Searching Authority; International Search Report for PCT/US2005/019069; Feb. 22, 2006; US.

United States Searching Authority; International Search Report for PCT/US2005/047659; Dec. 4, 2006; US.

United States Searching Authority; International Search Report for PCT/US2006/017596; Nov. 28, 2006; US.

United States Searching Authority; International Search Report for PCT/US2006/017598; Apr. 26, 2007; US.

Vesely, et al.; U.S. Appl. No. 11/724,523, filed Mar. 14, 2007; entitled: Horizontal perspective polarizing media.

Vesely, et al.; U.S. Appl. No. 11/724,524, filed Mar. 14, 2007; entitled: Shifted pixel polarized stereoscopic display.

Vesely, et al.; U.S. Appl. No. 11/724,525, filed Mar. 14, 2007; entitled: Composite pointer for stereoscopic simulation.

Vesely, M., IZ Demo [disk], Infinite Z, 2003, [retrieved on Jan. 11, 2008].

U.S. Appl. No. 11/141,650, filed May 31, 2005.

Office Action mailed Feb. 23, 2007 for U.S. Appl. No. 11/141,650.

Office Action mailed Aug. 20, 2007 for U.S. Appl. No. 11/141,650.

* cited by examiner

Figure 1: Different Types of Perspectives

Figure 4: Central Perspective Drawing

Figure 5: Horizontal Perspective Drawing

Figure 6: Horizontal Perspective Drawing Method

Figure 9: Map Horizontal Plane to Reference Plane

Figure 10: Projecting 3D Object points to Horizontal Plane

Figure 11: Simulation time

MULTI-PLANE HORIZONTAL PERSPECTIVE DISPLAY

This application claims priority from U.S. provisional applications Ser. No. 60/576,187 filed Jun. 1, 2004, entitled "Multi plane horizontal perspective display"; Ser. No. 60/576,189 filed Jun. 1, 2004, entitled "Multi plane horizontal perspective hand on simulator"; Ser. No. 60/576,182 filed Jun. 1, 2004, entitled "Binaural horizontal perspective display"; and Ser. No. 60/576,181 filed Jun. 1, 2004, entitled "Binaural horizontal perspective hand on simulator" which are incorporated herein by reference.

This application is related to co-pending applications Ser. No. 11/098,681 filed Apr. 4, 2005, entitled "Horizontal projection display"; Ser. No. 11/098,685 filed Apr. 4, 2005, entitled "Horizontal projection display", Ser. No. 11/098,667 filed Apr. 4, 2005, entitled "Horizontal projection hands-on simulator"; Ser. No. 11/098,682 filed Apr. 4, 2005, entitled "Horizontal projection hands-on simulator"; "Multi plane horizontal perspective display" filed May 27, 2005; "Multi plane horizontal perspective hand on simulator" filed May 27, 2005; "Binaural horizontal perspective display" filed May 27, 2005; and "Binaural horizontal perspective hand on simulator" filed May 27, 2005.

FIELD OF THE INVENTION

This invention relates to a three-dimensional display system, and in particular, to a multiple view display system.

BACKGROUND OF THE INVENTION

Ever since humans began to communicate through pictures, they faced a dilemma of how to accurately represent the three-dimensional world they lived in. Sculpture was used to successfully depict three-dimensional objects, but was not adequate to communicate spatial relationships between objects and within environments. To do this, early humans attempted to "flatten" what they saw around them onto two-dimensional, vertical planes (e.g. paintings, drawings, tapestries, etc.). Scenes where a person stood upright, surrounded by trees, were rendered relatively successfully on a vertical plane. But how could they represent a landscape, where the ground extended out horizontally from where the artist was standing, as far as the eye could see?

The answer is three dimensional illusions. The two dimensional pictures must provide a numbers of cues of the third dimension to the brain to create the illusion of three dimensional images. This effect of third dimension cues can be realistically achievable due to the fact that the brain is quite accustomed to it. The three dimensional real world is always and already converted into two dimensional (e.g. height and width) projected image at the retina, a concave surface at the back of the eye. And from this two dimensional image, the brain, through experience and perception, generates the depth information to form the three dimension visual image from two types of depth cues: monocular (one eye perception) and binocular (two eye perception). In general, binocular depth cues are innate and biological while monocular depth cues are learned and environmental.

The major binocular depth cues are convergence and retinal disparity. The brain measures the amount of convergence of the eyes to provide a rough estimate of the distance since the angle between the line of sight of each eye is larger when an object is closer. The disparity of the retinal images due to the separation of the two eyes is used to create the perception of depth. The effect is called stereoscopy where each eye receives a slightly different view of a scene, and the brain fuses them together using these differences to determine the ratio of distances between nearby objects.

Binocular cues are very powerful perception of depth. However, there are also depth cues with only one eye, called monocular depth cues, to create an impression of depth on a flat image. The major monocular cues are: overlapping, relative size, linear perspective and light and shadow. When an object is viewed partially covered, this pattern of blocking is used as a cue to determine that the object is farther away. When two objects known to be the same size and one appears smaller than the other, this pattern of relative size is used as a cue to assume that the smaller object is farther away. The cue of relative size also provides the basis for the cue of linear perspective where the farther away the lines are from the observer, the closer together they will appear since parallel lines in a perspective image appear to converge towards a single point. The light falling on an object from a certain angle could provide the cue for the form and depth of an object. The distribution of light and shadow on a objects is a powerful monocular cue for depth provided by the biologically correct assumption that light comes from above.

Perspective drawing, together with relative size, is most often used to achieve the illusion of three dimension depth and spatial relationships on a flat (two dimension) surface, such as paper or canvas. Through perspective, three dimension objects are depicted on a two dimension plane, but "trick" the eye into appearing to be in three dimension space. The first theoretical treatise for constructing perspective, Depictura, was published in the early 1400's by the architect, Leone Battista Alberti. Since the introduction of his book, the details behind "general" perspective have been very well documented. However, the fact that there are a number of other types of perspectives is not well known. Some examples are military, cavalier, isometric, and dimetric, as shown at the top of FIG. 1.

Of special interest is the most common type of perspective, called central perspective, shown at the bottom left of FIG. 1. Central perspective, also called one-point perspective, is the simplest kind of "genuine" perspective construction, and is often taught in art and drafting classes for beginners. FIG. 2 further illustrates central perspective. Using central perspective, the chess board and chess pieces look like three dimension objects, even though they are drawn on a two dimension flat piece of paper. Central perspective has a central vanishing point, and rectangular objects are placed so their front sides are parallel to the picture plane. The depth of the objects is perpendicular to the picture plane. All parallel receding edges run towards a central vanishing point. The viewer looks towards this vanishing point with a straight view. When an architect or artist creates a drawing using central perspective, they must use a single-eye view. That is, the artist creating the drawing captures the image by looking through only one eye, which is perpendicular to the drawing surface.

The vast majority of images, including central perspective images, are displayed, viewed and captured in a plane perpendicular to the line of vision. Viewing the images at angle different from 90° would result in image distortion, meaning a square would be seen as a rectangle when the viewing surface is not perpendicular to the line of vision. However, there is a little known class of images that we called it "horizontal perspective" where the image appears distorted when viewing head on, but displaying a three dimensional illusion when viewing from the correct viewing position. In horizontal perspective, the angle between the viewing surface and the line of vision is preferably 45° but can be almost any angle, and the viewing surface is perferrably horizontal (wherein the name "horizontal perspective"), but it can be any surface, as long as the line of vision forming a not-perpendicular angle to it.

Horizontal perspective images offer realistic three dimensional illusion, but are little known primarily due to the narrow viewing location (the viewer's eyepoint has to be coincide precisely with the image projection eyepoint), and the complexity involving in projecting the two dimensional image or the three dimension model into the horizontal perspective image.

The generation of horizontal perspective images require considerably more expertise to create than conventional perpendicular images. The conventional perpendicular images can be produced directly from the viewer or camera point. One need simply open one's eyes or point the camera in any direction to obtain the images. Further, with much experience in viewing three dimensional depth cues from perpendicular images, viewers can tolerate significant amount of distortion generated by the deviations from the camera point. In contrast, the creation of a horizontal perspective image does require much manipulation. Conventional camera, by projecting the image into the plane perpendicular to the line of sight, would not produce a horizontal perspective image. Making a horizontal drawing requires much effort and very time consuming. Further, since human has limited experience with horizontal perspective images, the viewer's eye must be positioned precisely where the projection eyepoint point is to avoid image distortion. And therefore horizontal perspective, with its difficulties, has received little attention.

SUMMARY OF THE INVENTION

The present invention recognizes that the personal computer is perfectly suitable for horizontal perspective display. It is personal, thus it is designed for the operation of one person, and the computer, with its powerful microprocessor, is well capable of rendering various horizontal perspective images to the viewer.

Thus the present invention multi-plane display system discloses a three dimension display system comprising at least two display surfaces, one of which displaying a three dimensional horizontal perspective images. The other display surfaces can display two dimensional images, or preferably three dimensional central perpective images. Further, the display surfaces can have a curvilinear blending display section to merge the various images. The multi-plane display system can comprise various camera eyepoints, one for the horizontal perspective images, one for the central perspective images, and optionally one for the curvilinear blending display surface. The multi-plane display surface can further adjust the various images to accommodate the position of the viewer. By changing the displayed images to keep the camera eyepoints of the horizontal perspective and central perspective images in the same position as the viewer's eye point, the viewer's eye is always positioned at the proper viewing position to perceive the three dimensional illusion, thus minimizing viewer's discomfort and distortion. The display can accept manual input such as a computer mouse, trackball, joystick, tablet, etc. to re-position the horizontal perspective images. The display can also automatically re-position the images based on an input device automatically providing the viewer's viewpoint location.

Further, the display is not limited to project three dimensional one eye model images but also three dimensional multi-view models. Also multiple inputs would further be included, one to keep the image in proper perspective, and one to manipulate the images such as rotation, movement or amplification.

DETAILED DESCRIPTION OF THE INVENTION

The present invention discloses a multi-plane display system comprising at least two display surfaces, one of which capable of projecting three dimensional illusion based on horizontal perspective projection.

In general, the present invention multi-plane display system can be used to display three dimensional images and has obvious utility to many industrial applications such as manufacturing design reviews, ergonomic simulation, safety and training, video games, cinematography, scientific 3D viewing, and medical and other data displays.

Horizontal perspective is a little-known perspective, of which we found only two books that describe its mechanics: Stereoscopic Drawing (©1990) and How to Make Anaglyphs (©1979, out of print). Although these books describe this obscure perspective, they do not agree on its name. The first book refers to it as a "free-standing anaglyph," and the second, a "phantogram." Another publication called it "projective anaglyph" (U.S. Pat. No. 5,795,154 by G. M. Woods, Aug. 18, 1998). Since there is no agreed-upon name, we have taken the liberty of calling it "horizontal perspective." Normrally, as in central perspective, the plane of vision, at right angle to the line of sight, is also the projected plane of the picture, and depth cues are used to give the illusion of depth to this flat image. In horizontal perspective, the plane of vision remains the same, but the projected image is not on this plane. It is on a plane angled to the plane of vision. Typically, the image would be on the ground level surface. This means the image will be physically in the third dimension relative to the plane of vision. Thus horizontal perspective can be called horizontal projection.

In horizontal perspective, the object is to separate the image from the paper, and fuse the image to the three dimension object that projects the horizontal perspective image. Thus the horizontal perspective image must be distorted so that the visual image fuses to form the free standing three dimensional figure. It is also essential the image is viewed from the correct eye points, otherwise the three dimensional illusion is lost. In contrast to central perspective images which have height and width, and project an illusion of depth, and therefore the objects are usually abruptly projected and the images appear to be in layers, the horizontal perspective images have actual depth and width, and illusion gives them height, and therefore there is usually a graduated shifting so the images appear to be continuous.

Figure 1:
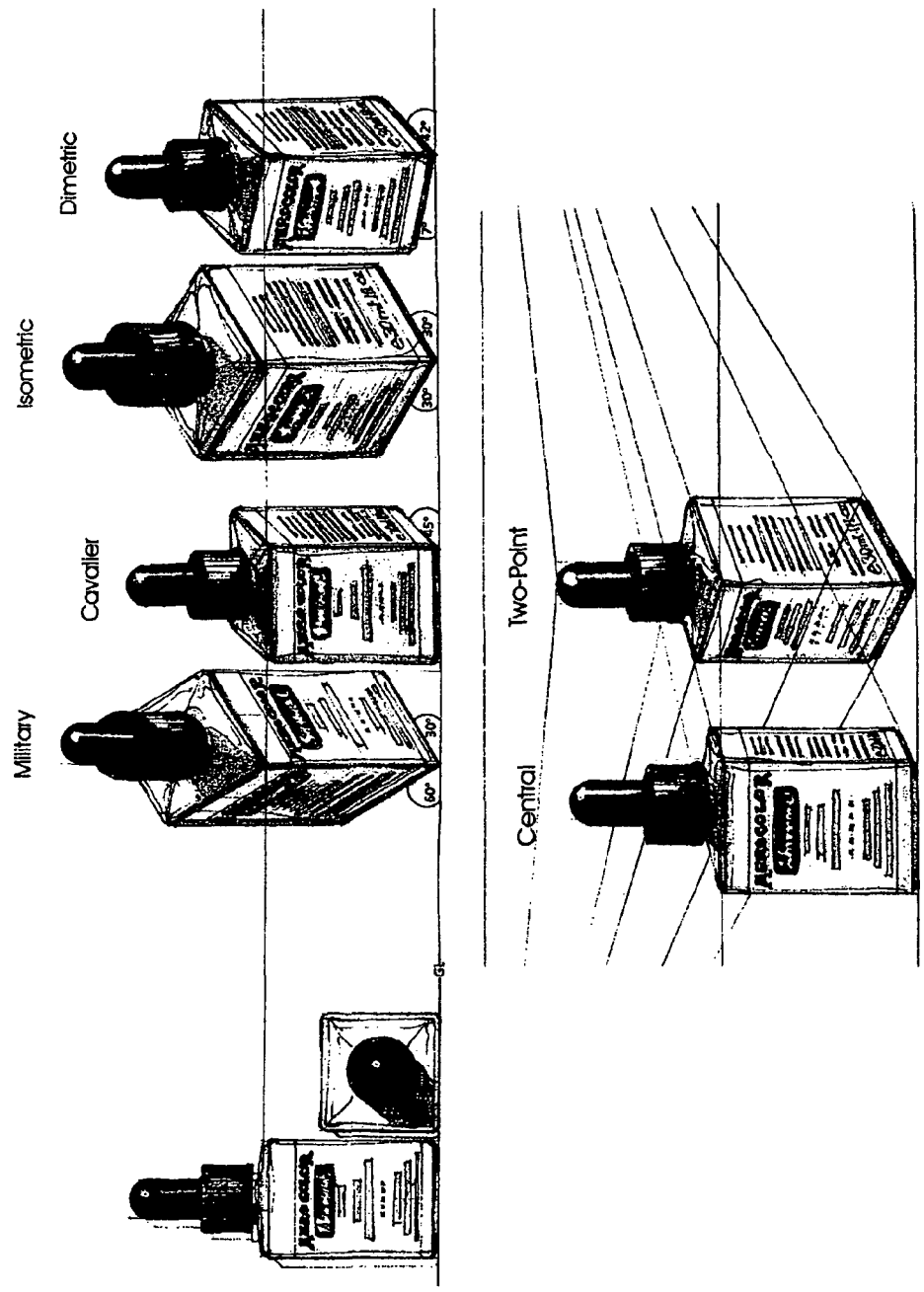
FIG. 1 shows the various perspective drawings.
Figure 2:
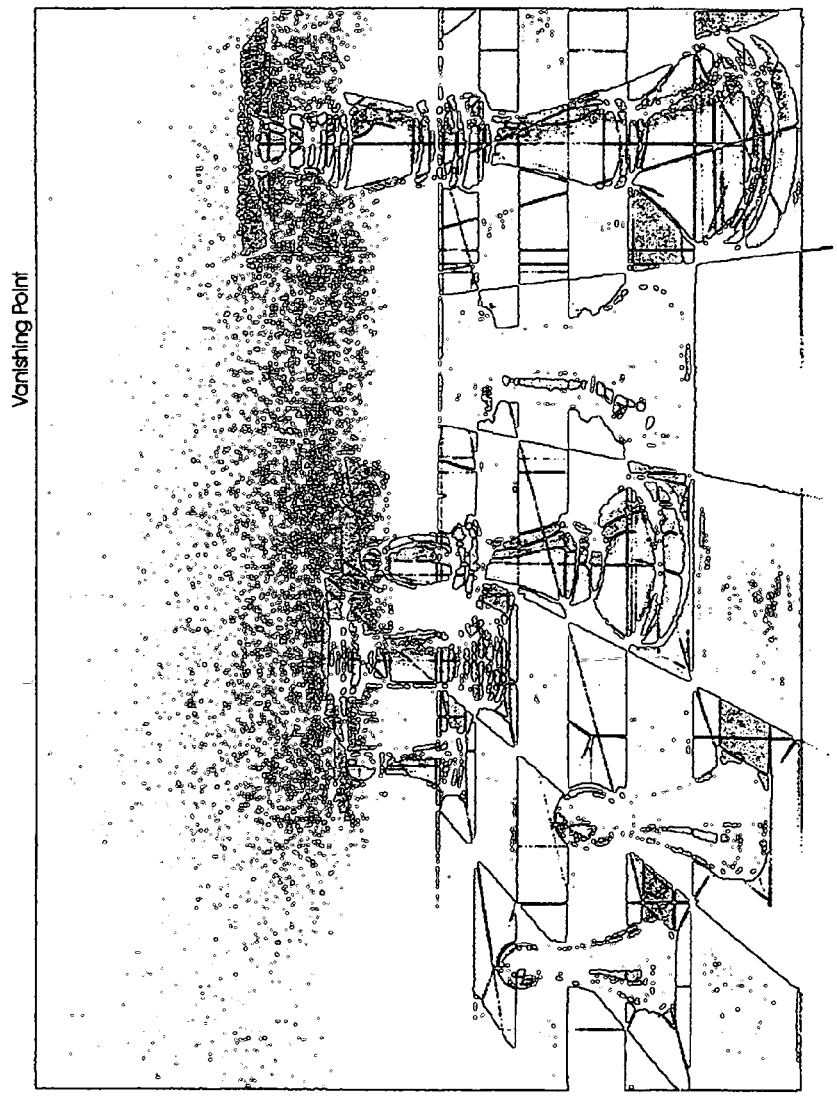
FIG. 2 shows a typical central perspective drawing.
Figure 3:
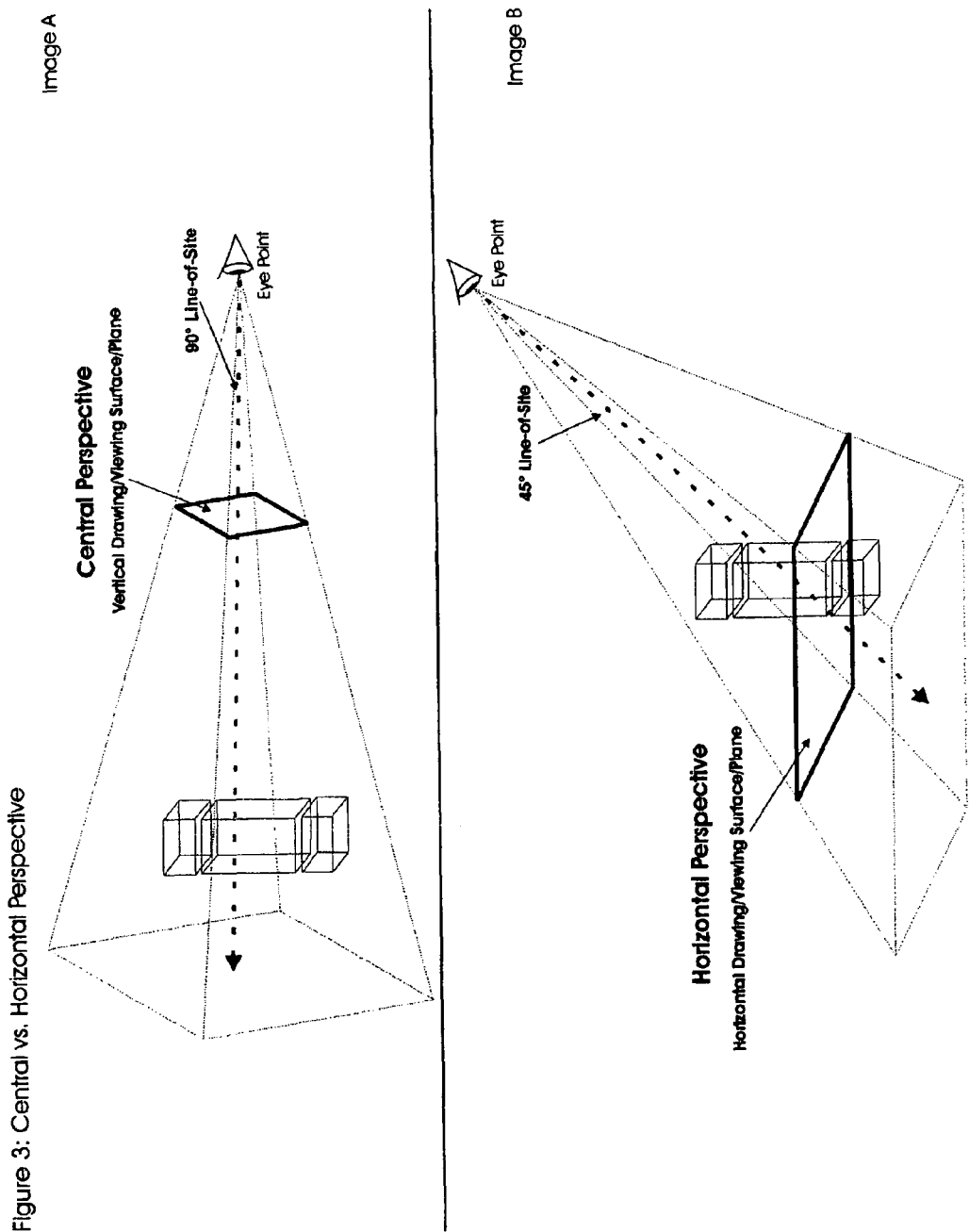
FIG. 3 shows the comparison of central perspective (Image A) and horizontal perspective (Image B).

FIG. 3 compares key characteristics that differentiate central perspective and horizontal perspective. Image A shows key pertinent characteristics of central perspective, and Image B shows key pertinent characteristics of horizontal perspective.

In other words, in Image A, the real-life three dimension object (three blocks stacked slightly above each other) was drawn by the artist closing one eye, and viewing along a line of sight perpendicular to the vertical drawing plane. The resulting image, when viewed vertically, straight on, and through one eye, looks the same as the original image.

In Image B, the real-life three dimension object was drawn by the artist closing one eye, and viewing along a line of sight 45° to the horizontal drawing plane. The resulting image, when viewed horizontally, at 45° and through one eye, looks the same as the original image.

One major difference between central perspective showing in Image A and horizontal perspective showing in Image B is the location of the display plane with respect to the projected three dimensional image. In horizontal perspective of Image B, the display plane can be adjusted up and down, and therefore the projected image can be displayed in the open air above the display plane, i.e. a physical hand can touch (or more likely pass through) the illusion, or it can be displayed under the display plane, i.e. one cannot touch the illusion because the display plane physically blocks the hand. This is the nature of horizontal perspective, and as long as the camera eyepoint and the viewer eyepoint is at the same place, the illusion is present. In contrast, in central perspective of Image A, the three dimensional illusion is likely to be only inside the display plane, meaning one cannot touch it. To bring the three dimensional illusion outside of the display plane to allow viewer to touch it, the central perspective would need elaborate display scheme such as surround image projection and large volume.

Figure 4:
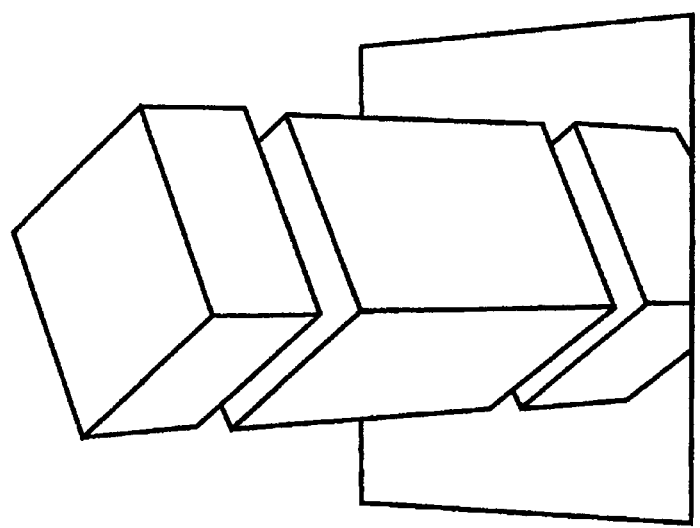
FIG. 4 shows the central perspective drawing of three stacking blocks.
Figure 5:
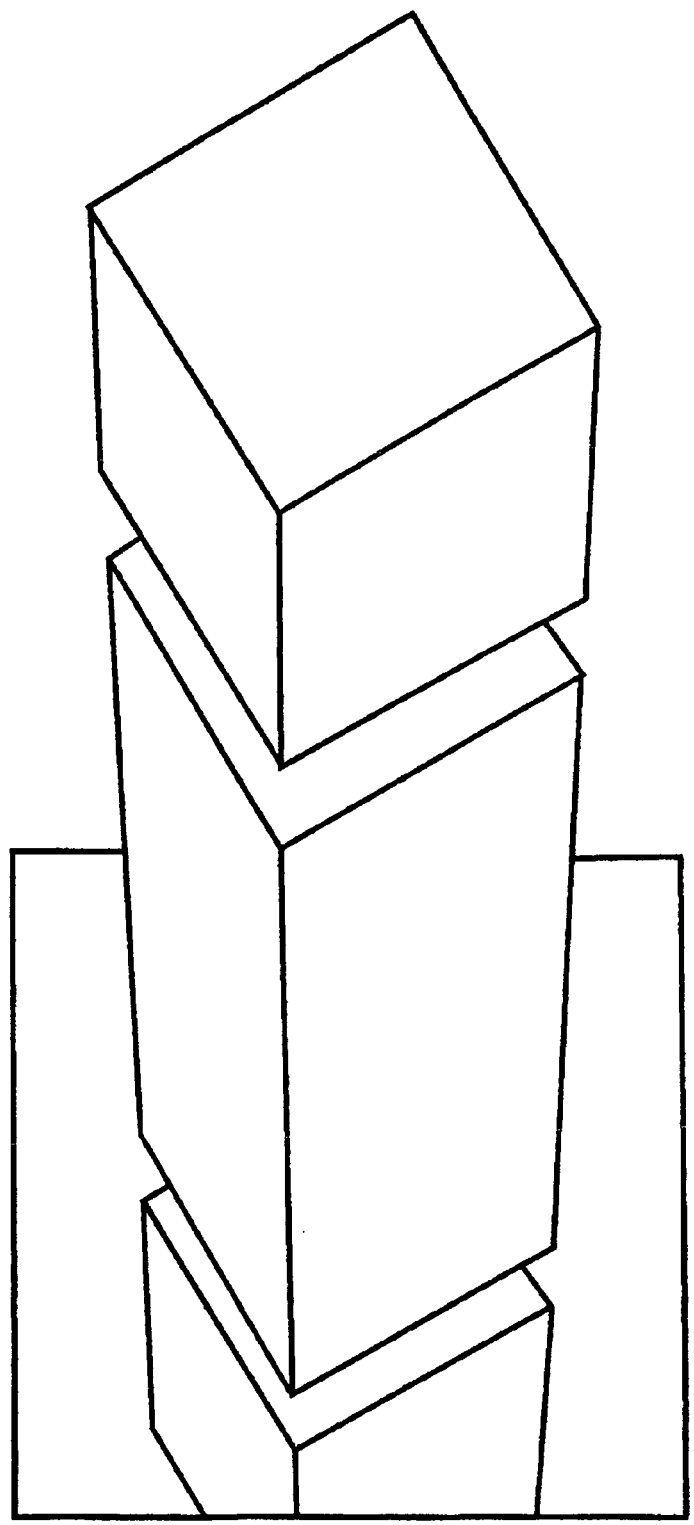
FIG. 5 shows the horizontal perspective drawing of three stacking blocks.

FIGS. 4 and 5 illustrate the visual difference between using central and horizontal perspective. To experience this visual difference, first look at FIG. 4, drawn with central perspective, through one open eye. Hold the piece of paper vertically in front of you, as you would a traditional drawing, perpendicular to your eye. You can see that central perspective provides a good representation of three dimension objects on a two dimension surface.

Now look at FIG. 5, drawn using horizontal perspective, by sifting at your desk and placing the paper lying flat (horizontally) on the desk in front of you. Again, view the image through only one eye. This puts your one open eye, called the eye point at approximately a 45° angle to the paper, which is the angle that the artist used to make the drawing. To get your open eye and its line-of-sight to coincide with the artist's, move your eye downward and forward closer to the drawing, about six inches out and down and at a 45° angle. This will result in the ideal viewing experience where the top and middle blocks will appear above the paper in open space.

Again, the reason your one open eye needs to be at this precise location is because both central and horizontal perspective not only define the angle of the line of sight from the eye point; they also define the distance from the eye point to the drawing. This means that FIGS. 4 and 5 are drawn with an ideal location and direction for your open eye relative to the drawing surfaces. However, unlike central perspective where deviations from position and direction of the eye point create little distortion, when viewing a horizontal perspective drawing, the use of only one eye and the position and direction of that eye relative to the viewing surface are essential to seeing the open space three dimension horizontal perspective illusion.

Figure 6:
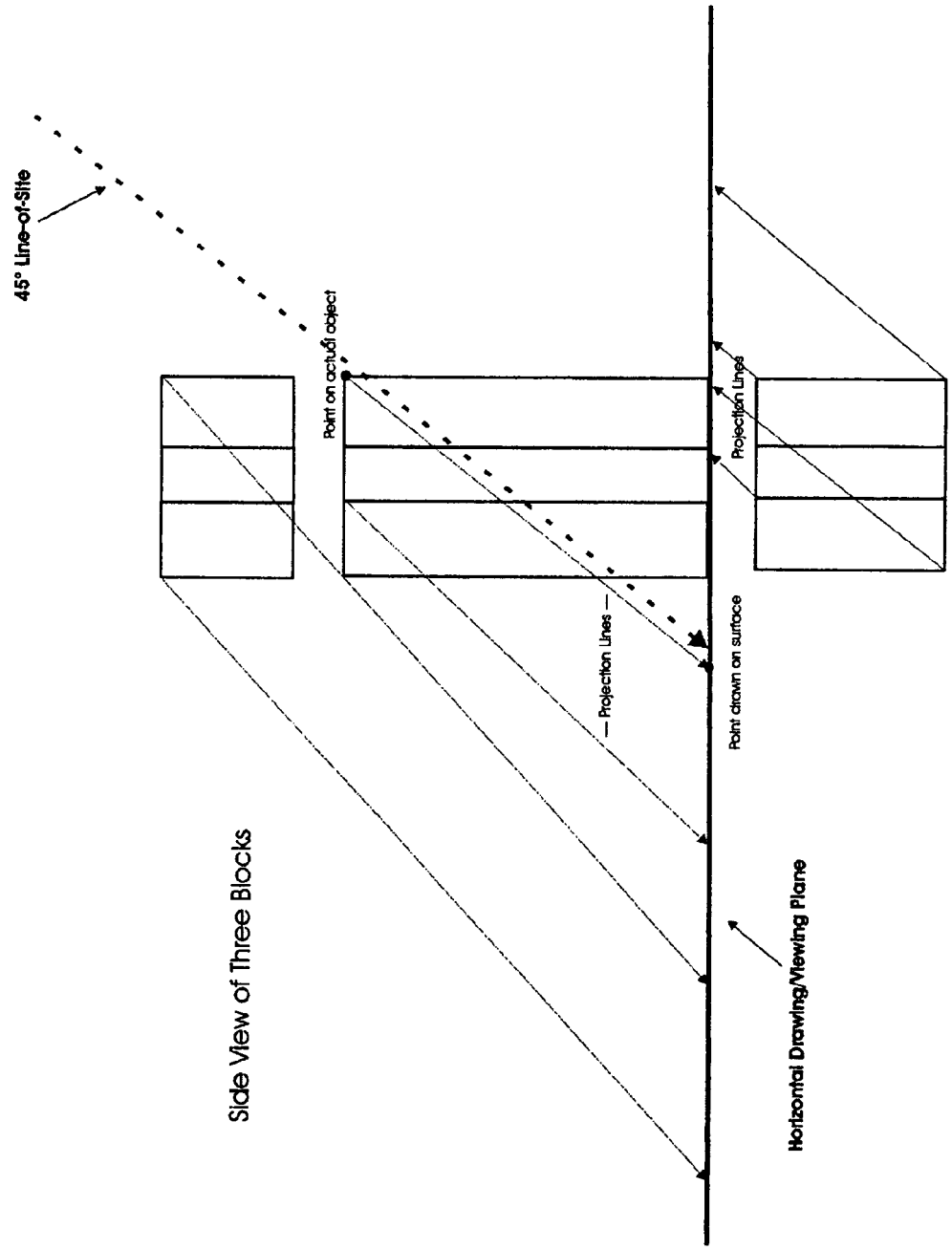
FIG. 6 shows the method of drawing a horizontal perspective drawing.

FIG. 6 is an architectural-style illustration that demonstrates a method for making simple geometric drawings on paper or canvas utilizing horizontal perspective. FIG. 6 is a side view of the same three blocks used in FIGS. 5. It illustrates the actual mechanics of horizontal perspective. Each point that makes up the object is drawn by projecting the point onto the horizontal drawing plane. To illustrate this, FIG. 6 shows a few of the coordinates of the blocks being drawn on the horizontal drawing plane through projection lines. These projection lines start at the eye point (not shown in FIG. 6 due to scale), intersect a point on the object, then continue in a straight line to where they intersect the horizontal drawing plane, which is where they are physically drawn as a single dot on the paper When an architect repeats this process for each and every point on the blocks, as seen from the drawing surface to the eye point along the line-of-sight the horizontal perspective drawing is complete, and looks like FIG. 5.

Notice that in FIG. 6, one of the three blocks appears below the horizontal drawing plane. With horizontal perspective, points located below the drawing surface are also drawn onto the horizontal drawing plane, as seen from the eye point along the line-of-site. Therefore when the final drawing is viewed, objects not only appear above the horizontal drawing plane, but may also appear below it as well—giving the appearance that they are receding into the paper. If you look again at FIG. 5, you will notice that the bottom box appears to be below, or go into, the paper, while the other two boxes appear above the paper in open space.

The generation of horizontal perspective images require considerably more expertise to create than central perspective images. Even though both methods seek to provide the viewer the three dimension illusion that resulted from the two dimensional image, central perspective images produce directly the three dimensional landscape from the viewer or camera point. In contrast, the horizontal perspective image appears distorted when viewing head on, but this distortion has to be precisely rendered so that when viewing at a precise location, the horizontal perspective produces a three dimensional illusion.

Figure 7:
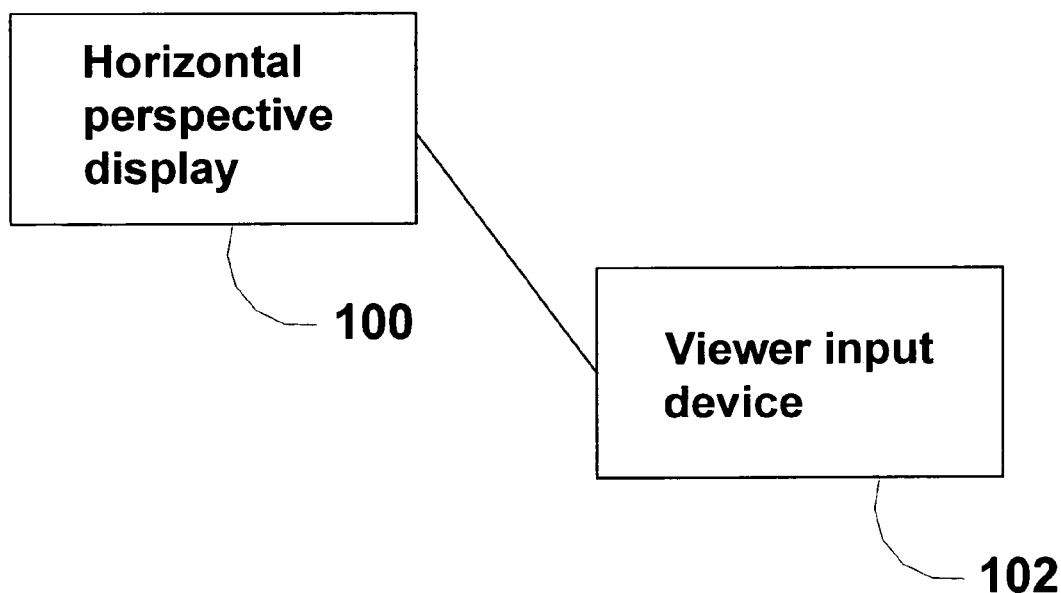
FIG. 7 shows a horizontal perspective display and an viewer input device.

The present invention multi-plane display system promotes horizontal perspective projection viewing by providing the viewer with the means to adjust the displayed images to maximize the illusion viewing experience. By employing the computation power of the microprocessor and a real time display, the horizontal perspective display of the present invention is shown in FIG. 7, comprising a real time electronic display 100 capable of re-drawing the projected image, together with a viewer's input device 102 to adjust the horizontal perspective image. By re-display the horizontal perspective image so that its projection eyepoint coincides with the eyepoint of the viewer, the horizontal perspective display of the present invention can ensure the minimum distortion in rendering the three dimension illusion from the horizontal perspective method. The input device can be manually operated where the viewer manually inputs his or her eyepoint location, or change the projection image eyepoint to obtain the optimum three dimensional illusion. The input device can also be automatically operated where the display automatically tracks the viewer's eyepoint and adjust the projection image accordingly. The multi-plane display system removes the constraint that the viewers keeping their heads in relatively fixed positions, a constraint that create much difficulty in the acceptance of precise eyepoint location such as horizontal perspective or hologram display.

Figure 8:
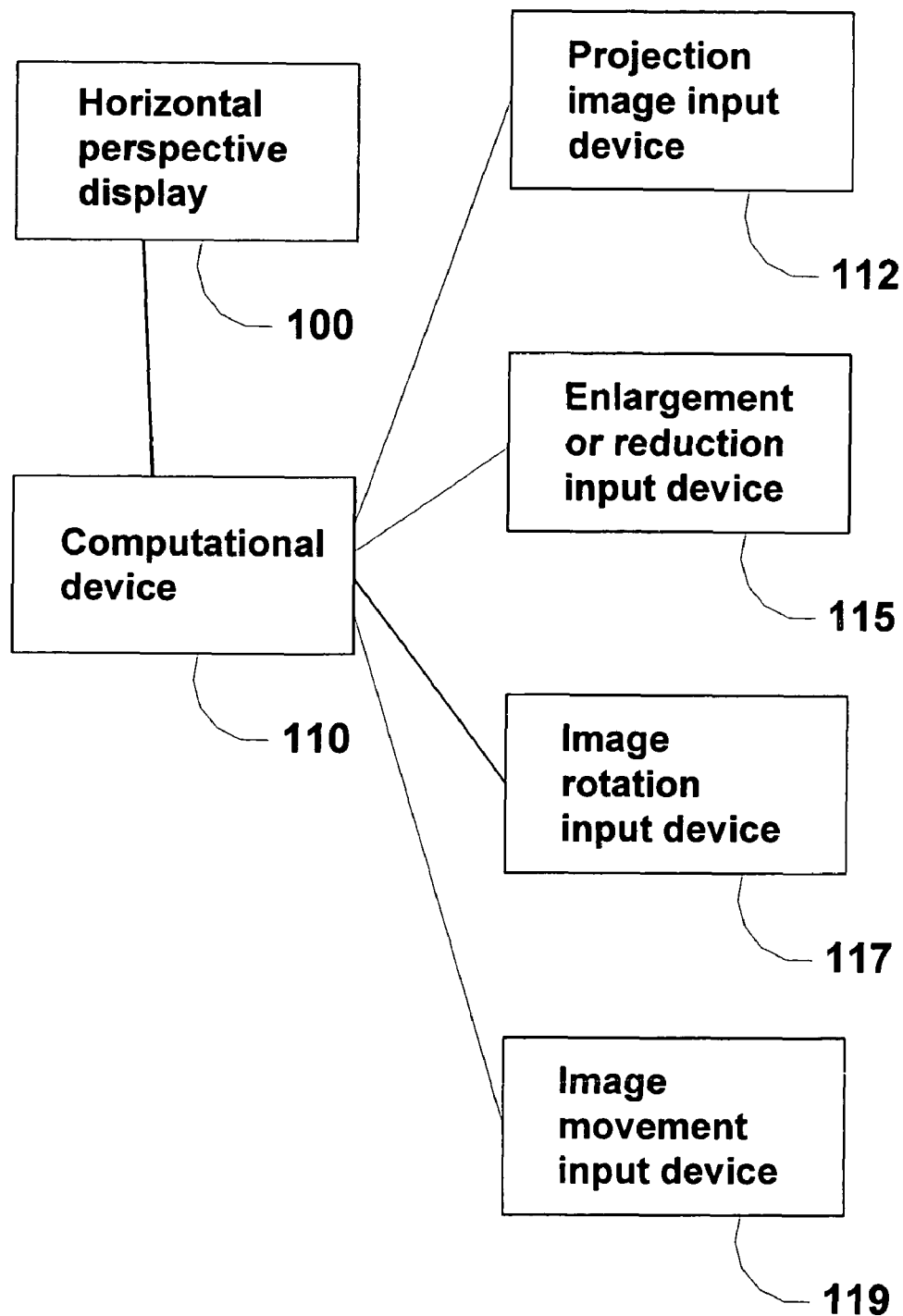
FIG. 8 shows a horizontal perspective display, a computational device and an viewer input device.

The horizontal perspective display system, shown in FIG. 8, can further a computation device 110 in addition to the real time electronic display device 100 and projection image input device 112 providing input to the computational device 110 to calculating the projectional images for display to providing a realistic, minimum distortion three dimensional illusion to the viewer by coincide the viewer's eyepoint with the projection image eyepoint. The system can further comprise an image enlargement/reduction input device 115, or an image rotation input device 117, or an image movement device 119 to allow the viewer to adjust the view of the projection images.

The input device can be operated manually or automatically. The input device can detect the position and orientation of the viewew eyepoint, to compute and to project the image onto the display according to the detection result. Alternatively, the input device can be made to detect the position and orientation of the viewer's head along with the orientation of the eyeballs. The input device can comprise an infrared detection system to detect the position the viewer's head to allow the viewer freedom of head movement. Other embodiments of the input device can be the triangulation method of detecting the viewer eyepoint location, such as a CCD camera providing position data suitable for the head tracking objectives of the invention. The input device can be manually operated by the viewer, such as a keyboard, mouse, trackball, joystick, or the like, to indicate the correct display of the horizontal perspective display images.

The head or eye-tracking system can comprise a base unit and a head-mounted sensor on the head of the viewer. The head-mounted sensor produces signals showing the position and orientation of the viewer in response to the viewer's head movement and eye orientation. These signals can be received by the base unit and are used to compute the proper three dimensional projection images. The head or eye tracking system can be infrared cameras to capture images of the viewer's eyes. Using the captured images and other techniques of image processing, the position and orientation of the viewer's eyes can be determined, and then provided to the base unit. The head and eye tracking can be done in real time for small enough time interval to provide continous viewer's head and eye tracking.

The multi-plane display system comprises a number of new computer hardware and software elements and processes, and together with existing components creates a horizontal perspective viewing simulator. For the viewer to experience these unique viewing simulations the computer hardware viewing surface is preferrably situated horizontally, such that the viewer's line of sight is at a 45° angle to the surface. Typically, this means that the viewer is standing or seated vertically, and the viewing surface is horizontal to the ground. Note that although the viewer can experience hands-on simulations at viewing angles other than 45° (e.g. 55°, 30° etc.), it is the optimal angle for the brain to recognize the maximum amount of spatial information in an open space image. Therefore, for simplicity's sake, we use "45°" throughout this document to mean "an approximate 45 degree angle". Further, while horizontal viewing surface is preferred since it simulates viewers' experience with the horizontal ground, any viewing surface could offer similar three dimensional illusion experience. The horizontal perspective illusion can appear to be hanging from a ceiling by projecting the horizontal perspective images onto a ceiling surface, or appear to be floating from a wall by projecting the horizontal perspective images onto a vertical wall surface.

Figure 9:
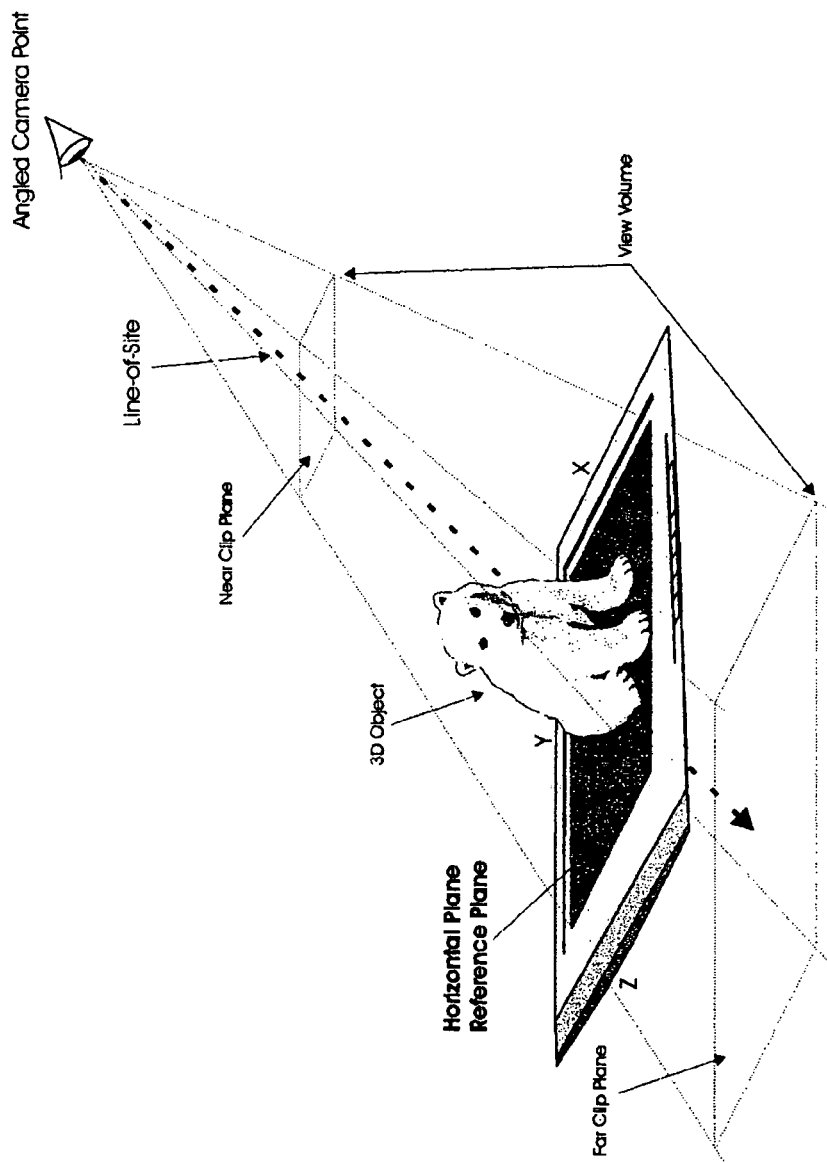
FIG. 9 shows mapping of the 3-d object onto the horizontal plane.

The viewing simulations are generated within a three dimensional graphics view volume, both situated above and below the physical viewing surface. Mathematically, the computer-generated x, y, z coordinates of the Angled Camera point form the vertex of an infinite "pyramid", whose sides pass through the x, y, z coordinates of the Reference/Horizontal Plane. FIG. 9 illustrates this infinite pyramid, which begins at the Angled Camera point and extending through the Far Clip Plane. The viewing volume is defined by a Comfort Plane, a plabe on top of the viewing volume, and is appropriately named because its location within the pyramid determines the viewer's personal comfort, i.e. how their eyes, head, body, etc. are situated while viewing and interacting with simulations.

For the viewer to view open space images on their physical viewing device it must be positioned properly, which usually means the physical Reference Plane is placed horizontally to the ground. Whatever the viewing device's position relative to the ground, the Reference/Horizontal Plane must be at approximately a 45° angle to the viewer's line-of-site for optimum viewing.

One way the viewer might perform this step is to position their CRT computer monitor on the floor in a stand, so that the Reference/Horizontal Plane is horizontal to the floor. This example uses a CRT-type television or computer monitor, but it could be any type of viewing device, display screen, monochromic or color display, luminescent, TFT, phosphorescent, computer projectors and other method of image generation in general, providing a viewing surface at approximately a 45° angle to the viewer's line-of-sight.

The display needs to know the view's eyepoint to proper display the horizontal perspective images. One way to do this is for the viewer to supply the horizontal perspective display with their eye's real-world x, y, z location and line-of-site information relative to the center of the physical Reference/Horizontal Plane. For example, the viewer tells the horizontal perspective display that their physical eye will be located 12 inches up, and 12 inches back, while looking at the center of the Reference/Horizontal Plane. The horizontal perspective display then maps the computer-generated Angled Camera point to the viewer's eyepoint physical coordinates and line-of-site. Another way is for the viewer to manually adjusting an input device such as a mouse, and the horizontal perspective display adjust its image projection eyepoint until the proper eyepoint location is experienced by the viewer. Another way way is using triangulation with infrared device or camera to automatically locate the viewer's eyes locations.

Figure 10:
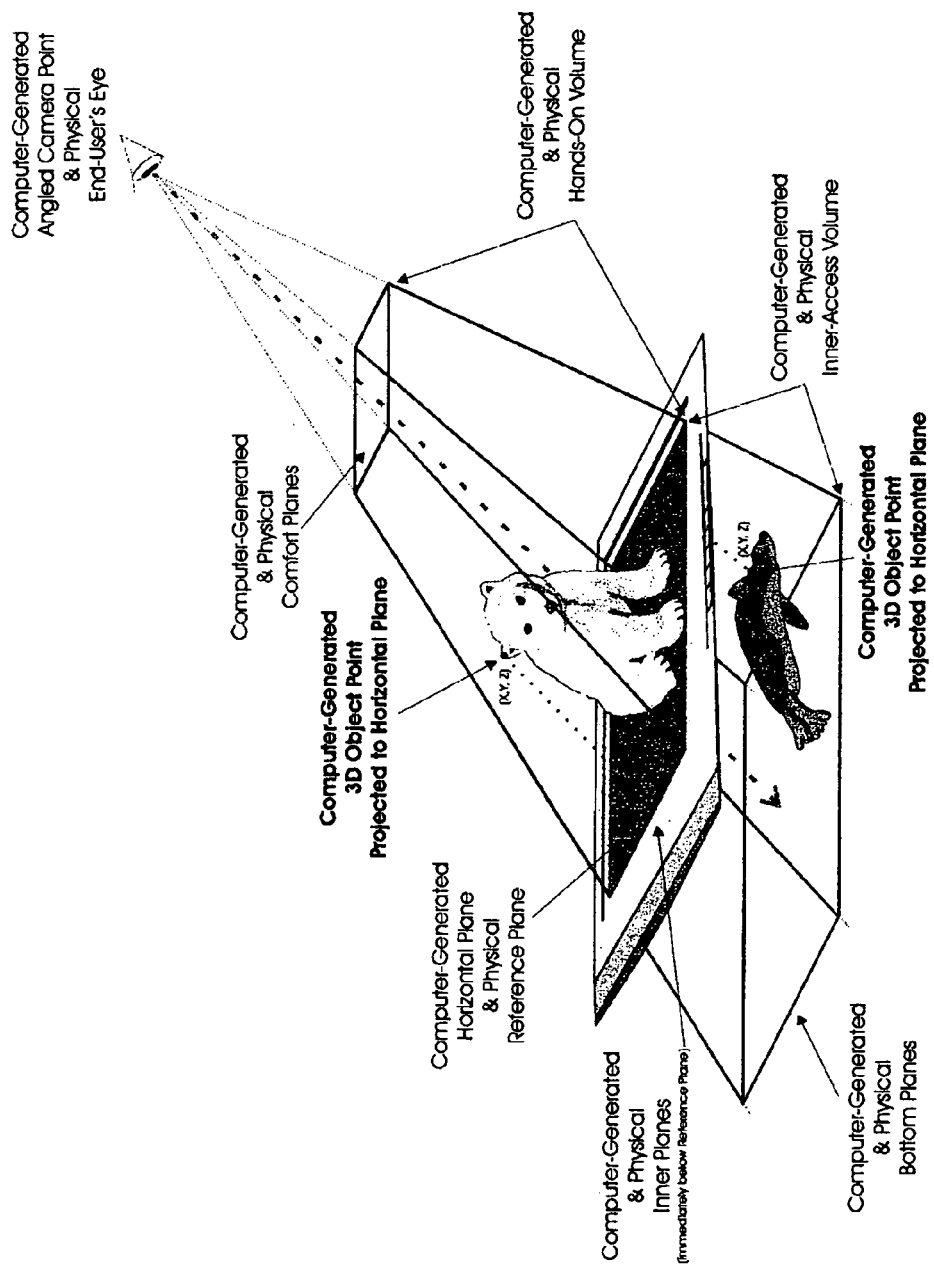
FIG. 10 shows the projection of 3-d object by horizontal perspective.

FIG. 10 is an illustration of the horizontal perspective display that includes all of the new computer-generated and real physical elements as described in the steps above. It also shows that a real-world element and its computer-generated equivalent are mapped 1:1 and together share a common Reference Plane. The full implementation of this horizontal perspective display results in a real-time computer-generated three dimensional graphics appearing in open space on and above a viewing device's surface, which is oriented approximately 45° to the viewer's line-of-sight.

The present invention also allows the viewer to move around the three dimensional display and yet suffer no great distortion since the display can track the viewer eyepoint and re-display the images correspondingly, in contrast to the conventional pior art three dimensional image display where it would be projected and computed as seen from a singular viewing point, and thus any movement by the viewer away from the intended viewing point in space would cause gross distortion.

The display system can further comprise a computer capable of re-calculate the projected image given the movement of the eyepoint location. The horizontal perspective images can be very complex, tedious to create, or created in ways that are not natural for artists or cameras, and therefore require the use of a computer system for the tasks. To display a three-dimensional image of an object with complex surfaces or to create an animation sequences would demand a lot of computational power and time, and therefore it is a task well suited to the computer. Three dimensional capable electronics and computing hardware devices and real-time computer-generated three dimensional computer graphics have advanced significantly recently with marked innovations in visual, audio and tactile systems, and have producing excellent hardware and software products to generate realism and more natural computer-human interfaces.

The multi-plane display system of the present invention are not only in demand for entertainment media such as televisions, movies, and video games but are also needed from various fields such as education (displaying three-dimensional structures), technological training (displaying three-dimensional equipment). There is an increasing demand for three-dimensional image displays, which can be viewed from various angles to enable observation of real objects using object-like images. The horizontal perspective display system is also capable of substitute a computer-generated reality for the viewer observation. The systems may include audio, visual, motion and inputs from the user in order to create a complete experience of three dimensional illusion.

The input for the horizontal perspective system can be two dimensional image, several images combined to form one single three dimensional image, or three dimensional model. The three dimensional image or model conveys much more information than that a two dimensional image and by changing viewing angle, the viewer will get the impression of seeing the same object from different perspectives continuously.

The multi-plane display system can further provide multiple views or "Multi-View" capability. Multi-View provides the viewer with multiple and/or separate left-and right-eye views of the same simulation. Multi-View capability is a significant visual and interactive improvement over the single eye view. In Multi-View mode, both the left eye and right eye images are fused by the viewer's brain into a single, three-dimensional illusion. The problem of the discrepancy between accommodation and convergence of eyes, inherent in stereoscopic images, leading to the viewer's eye fatigue with large discrepancy, can be reduced with the horizontal perspective display, especially for motion images, since the position of the viewer's gaze point changes when the display scene changes.

In Multi-View mode, the objective is to simulate the actions of the two eyes to create the perception of depth, namely the left eye and the right right sees slightly different images. Thus Multi-View devices that can be used in the present invention include methods with glasses such as anaglyph method, special polarized glasses or shutter glasses, methods without using glasses such as a parallax stereogram, a lenticular method, and mirror method (concave and convex lens).

In anaglyph method, a display image for the right eye and a display image for the left eye are respectively superimpose-displayed in two colors, e.g., red and blue, and observation images for the right and left eyes are separated using color filters, thus allowing a viewer to recognize a stereoscopic image. The images are displayed using horizontal perspective technique with the viewer looking down at an angle. As with one eye horizontal perspective method, the eyepoint of the projected images has to be coincide with the eyepoint of the viewer, and therefore the viewer input device is essential in allowing the viewer to observe the three dimensional horizontal perspective illusion. From the early days of the anaglyph method, there are much improvements such as the spectrum of the red/blue glasses and display to generate much more realizm and comfort to the viewers.

In polarized glasses method, the left eye image and the right eye image are separated by the use of mutually extinguishing polarizing filters such as orthogonally linear polarizer, circular polarizer, elliptical polarizer. The images are normally projected onto screens with polarizing filters and the viewer is then provided with corresponding polarized glasses. The left and right eye images appear on the screen at the same time, but only the left eye polarized light is transmitted through the left eye lens of the eyeglasses and only the right eye polarized light is transmitted through the right eye lens.

Another way for stereocopic display is the image sequential system. In such a system, the images are displayed sequentially between left eye and right eye images rather than superimposing them upon one another, and the viewer's lenses are synchronized with the screen display to allow the left eye to see only when the left image is displayed, and the right eye to see only when the right image is displayed. The shuttering of the glasses can be achieved by mechanical shuttering or with liquid crystal electronic shuttering. In shuttering glass method, display images for the right and left eyes are alternately displayed on a CRT in a time sharing manner, and observation images for the right and left eyes are separated using time sharing shutter glasses which are opened/closed in a time sharing manner in synchronism with the display images, thus allowing an observer to recognize a stereoscopic image.

Other way to display stereoscopic images is by optical method. In this method, display images for the right and left eyes, which are separately displayed on a viewer using optical means such as prisms, mirror, lens, and the like, are superimpose-displayed as observation images in front of an observer, thus allowing the observer to recognize a stereoscopic image. Large convex or concave lenses can also be used where two image projectors, projecting left eye and right eye images, are providing focus to the viewer's left and right eye respectively. A variation of the optical method is the lenticular method where the images form on cylindrical lens elements or two dimensional array of lens elements.

Figure 11:
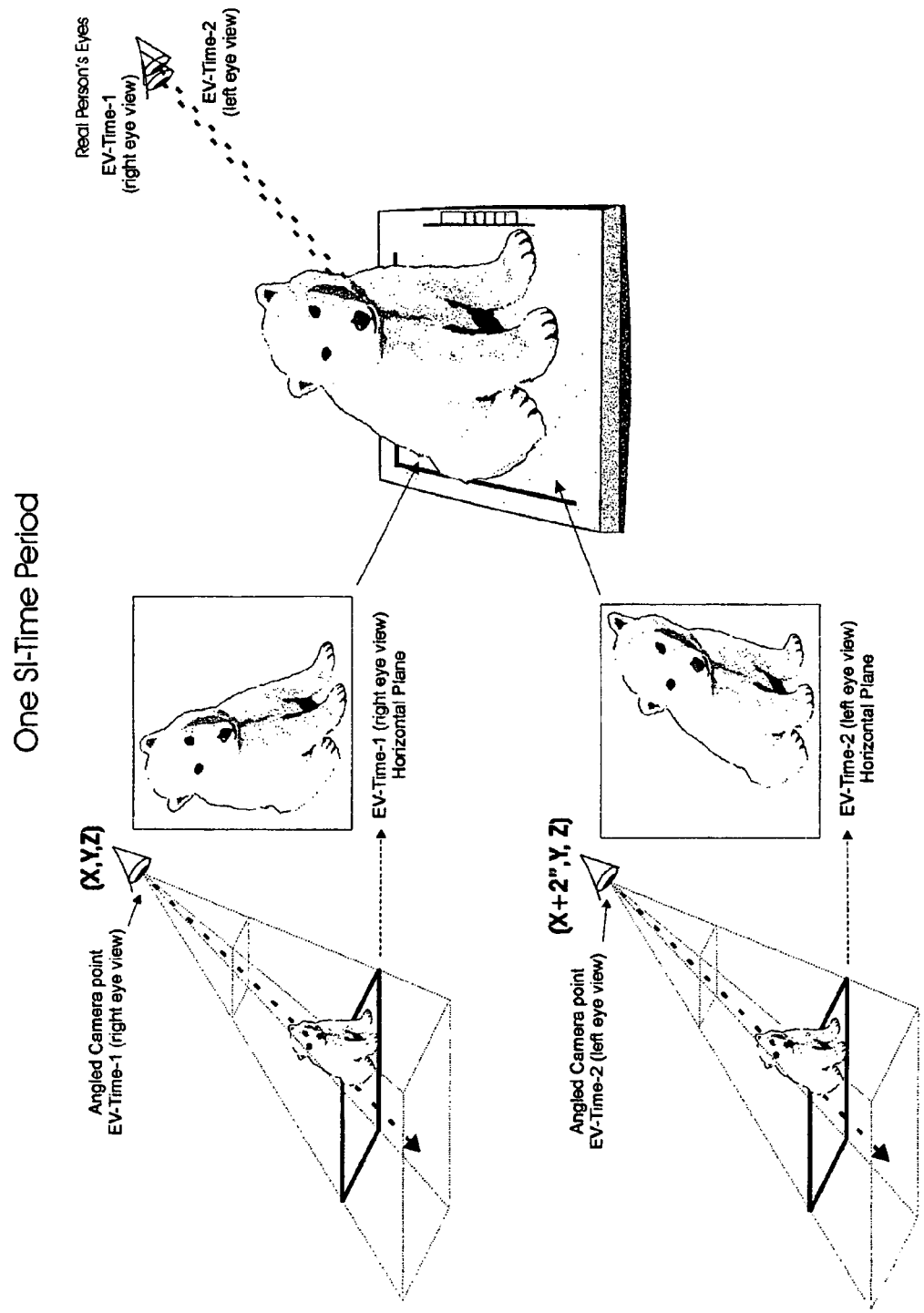
FIG. 11 shows the simulation time of the horizontal perspective.

FIG. 11 is a horizontal perspective display focusing on how the computer-generated person's two eye views are projected onto the Horizontal Plane and then displayed on a stereoscopic 3D capable viewing device. FIG. 11 represents one complete display time period. During this display time period, the horizontal perspective display needs to generate two different eye views, because in this example the stereoscopic 3D viewing device requires a separate left- and right-eye view. There are existing stereoscopic 3D viewing devices that require more than a separate left- and right-eye view, and because the method described here can generate multiple views it works for these devices as well.

The illustration in the upper left of FIG. 11 shows the Angled Camera point for the right eye after the first (right) eye-view to be generated. Once the first (right) eye view is complete, the horizontal perspective display starts the process of rendering the computer-generated person's second eye (left-eye) view. The illustration in the lower left of FIG. 11 shows the Angled Camera point for the left eye after the completion of this time. But before the rendering process can begin, the horizontal perspective display makes an adjustment to the Angled Camera point. This is illustrated in FIG. 11 by the left eye's x coordinate being incremented by two inches. This difference between the right eye's x value and the left eye's x+2" is what provides the two-inch separation between the eyes, which is required for stereoscopic 3D viewing. The distances between people's eyes vaty but in the above example we are using the average of 2 inches. It is also possible for the view to supply the horizontal perspective display with their personal eye separation value. This would make the x value for the left and right eyes highly accurate for a given viewer and thereby improve the quality of their stereoscopic 3D view.

Once the horizontal perspective display has incremented the Angled Camera point's x coordinate by two inches, or by the personal eye separation value supplied by the viewer, the rendering continues by displaying the second (left-eye) view.

Depending on the stereoscopic 3D viewing device used, the horizontal perspective display continues to display the left- and right-eye images, as described above, until it needs to move to the next display time period. An example of when this may occur is if the bear cub moves his paw or any part of his body. Then a new and second Simulated Image would be required to show the bear cub in its new position. This new Simulated Image of the bear cub, in a slightly different location, gets rendered during a new display time period. This process of generating multiple views via the nonstop incrementing of display time continues as long as the horizontal perspective display is generating real-time simulations in stereoscopic 3D.

By rapidly display the horizontal perspective images, three dimensional illusion of motion can be realized. Typically, 30 to 60 images per second would be adequate for the eye to perceive motion. For stereocopy, the same display rate is needed for superimposed images, and twice that amount would be needed for time sequential method.

The display rate is the number of images per second that the display uses to completely generate and display one image. This is similar to a movie projector where 24 times a second it displays an image. Therefore, 1/24 of a second is required for one image to be displayed by the projector. But the display time could be a variable, meaning that depending on the complexity of the view volumes it could take 1/12 or 1/2 a second for the computer to complete just one display image. Since the display was generating a separate left and right eye view of the same image, the total display time is twice the display time for one eye image.

Figure 12:
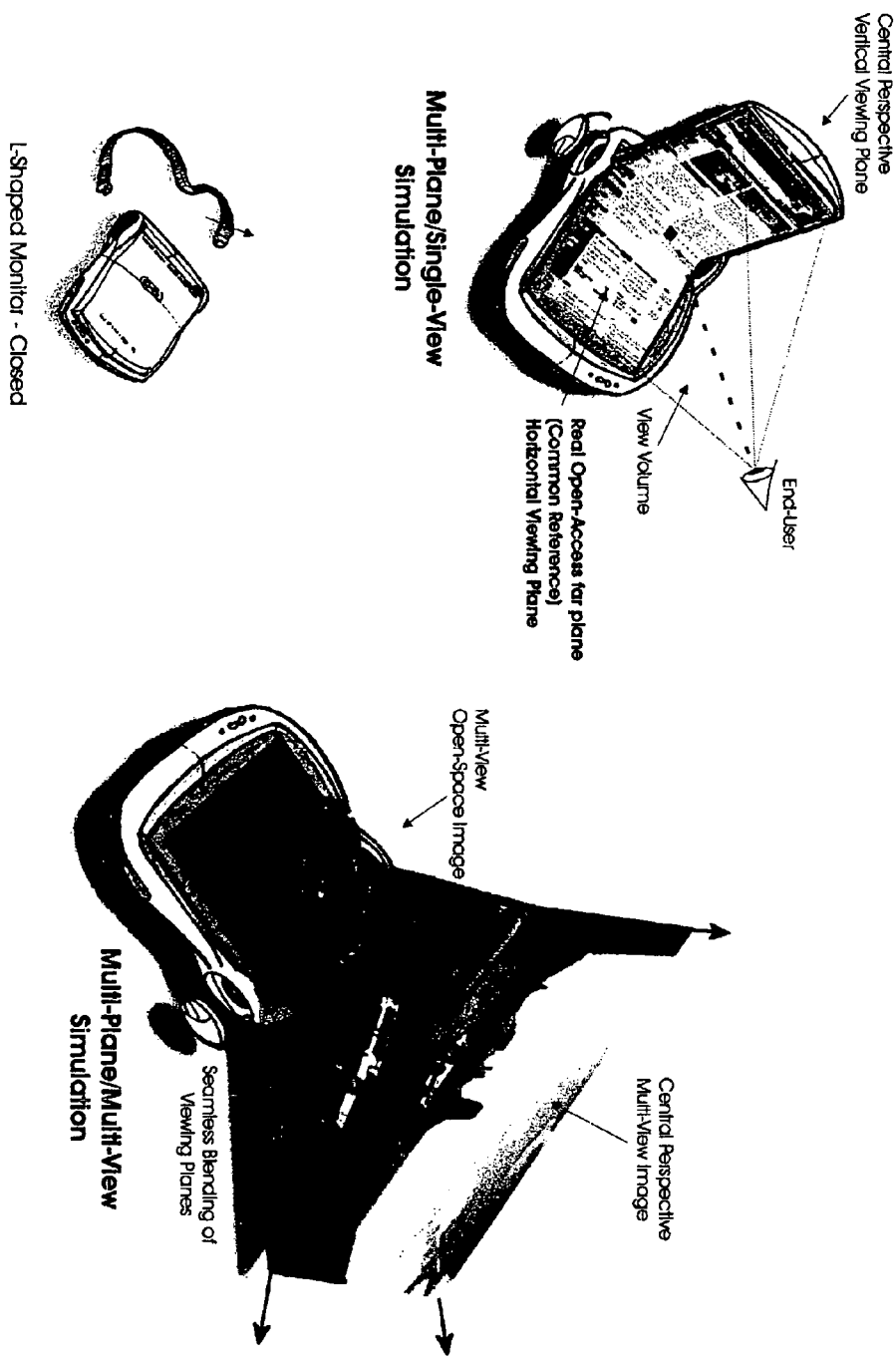
FIG. 12 shows an embodiment of the present invention multi-plane display.

The present invention further discloses a Multi-Plane display comprising a horizontal perspective display together with a non-horizontal central perspective display. FIG. 12 illustrates an example of the present invention Multi-Plane display in which the Multi-Plane display is a computer monitor that is approximately "L" shaped when open. The end-user views the L-shaped computer monitor from its concave side and at approximately a 45° angle to the bottom of the "L," as shown in FIG. 12. From the end-user's point of view the entire L-shaped computer monitor appears as one single and seamless viewing surface. The bottom L of the display, positioned horizontally, shows horizontal perspective image, and the other branch of the L display shows central perspective image. The edge is the two display segments is preferably smoothly joined and can also having a curvilinear projection to connect the two displays of horizontal perspective and central perspective.

The Multi-Plane display can be made with one or more physical viewing surfaces. For example, the vertical leg of the "L" can be one physical viewing surface, such as a flat panel display, and the horizontal leg of the "L" can be a separate flat panel display. The edge of the two display segments can be a non-display segment and therefore the two viewing surfaces are not continuous. Each leg of a Multi-Plane display is called a viewing plane and as you can see in the upper left of FIG. 12 there is a vertical viewing plane and a horizontal viewing plane where a central perspective image is generated on the vertical plane and a horizontal perspective image is generated on the horizontal plane, and then blend the two images where the planes meet, as illustrated in the lower right of FIG. 12.

FIG. 12 also illustrates that a Multi-Plane display is capable of generating multiple views. Meaning that it can display single-view images, i.e. a one-eye perspective like the simulation in the upper left, and/or multi-view images, i.e. separate right and left eye views like the simulation in the lower right. And when the L-shaped computer monitor is not being used by the end-user it can be closed and look like the simulation in the lower left.

Figure 13:
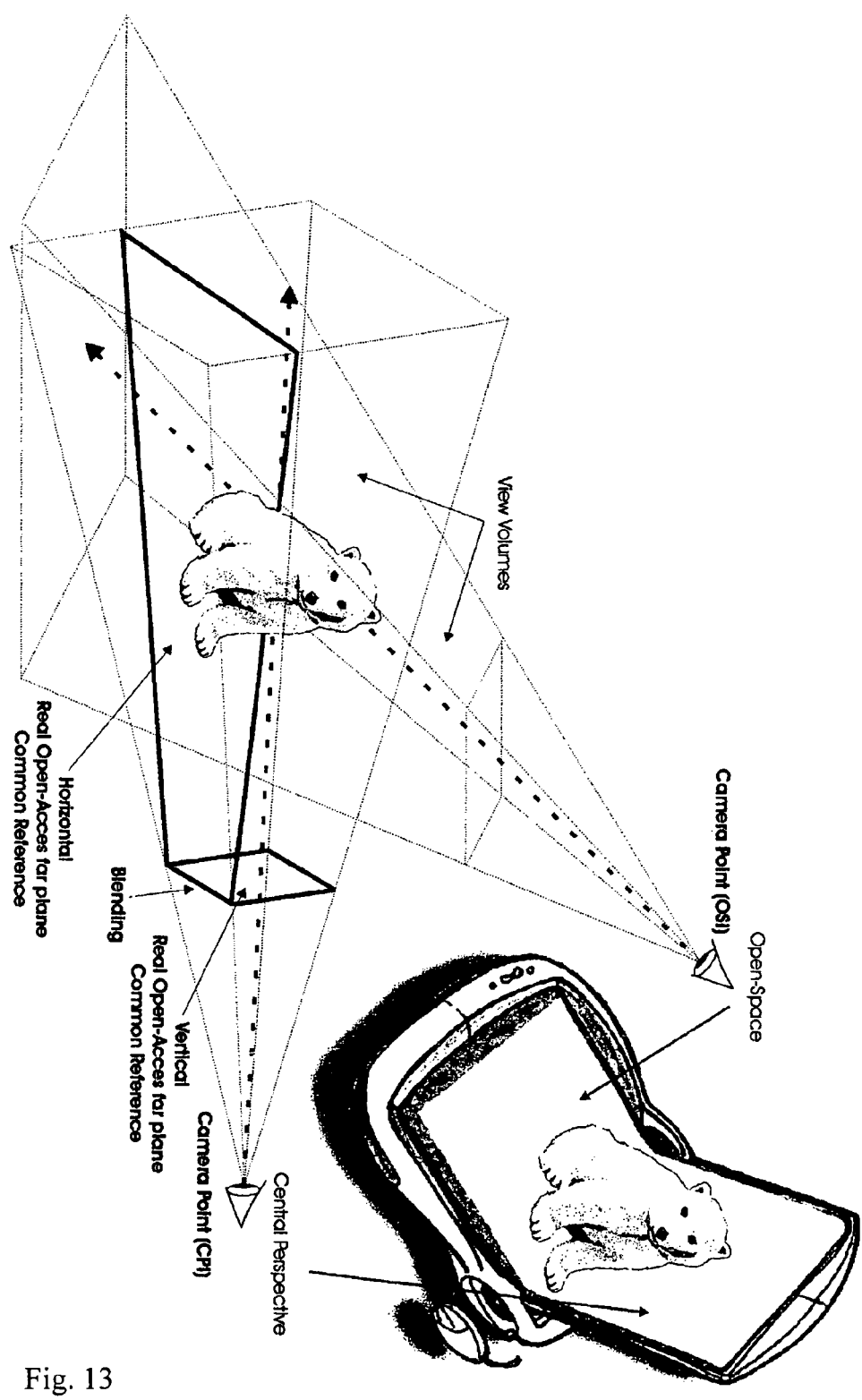
FIG. 13 shows the horizontal perspective and central perspective projection on the present invention multi-plane display.

FIG. 13 is a simplified illustration of the present invention Multi-Plane display. In the upper right of FIG. 13 is an example of a single-view image of a bear cub that is displayed on an L-shaped computer monitor. Normally a single-view or one eye image would be generated with only one camera point, but as you can see there are at least two camera points for the Multi-Plabe display even though this is a single-view example. This is because each viewing plane of a Multi-Plane device requires its own rendering perspective. One camera point is for the horizontal perspective image, which is displayed on the horizontal surface, and the other camera point is for the central perspective image, which is displayed on the vertical surface.

To generate both the horizontal perspective and central perspective images requires the creation of two camera eye-points (which can be the same or different) as shown in FIG. 13 for two different and separate camera points labeled OSI and CPI. The vertical viewing plane of the L-shaped monitor, as shown at the bottom of FIG. 13, is the display surface for the central perspective images, and thus there is a need to define another common reference plane for this surface. As discussed above, the common reference plane is the plane where the images are display, and the computer need to keep track of this plane for the synchronization of the locations of the displayed images and the real physical locations. With the L-shaped Multi-Plane device and the two display surfaces, the Simulation can to generate the three dimansional images, a horizontal perspective image using (OSI) camera eyepoint, and a central perspective image using (CPI) camera eyepoint.

The multi-plane display system can further include a curvilinear connection display section to blend the horizontal perspective and the central perspective images together at the location of the seam in the "L," as shown at the bottom of FIG. 13. The multi-plane display system can continuously update and display what appears to be a single L-shaped image on the L-shaped Multi-Plane device.

Figure 14:
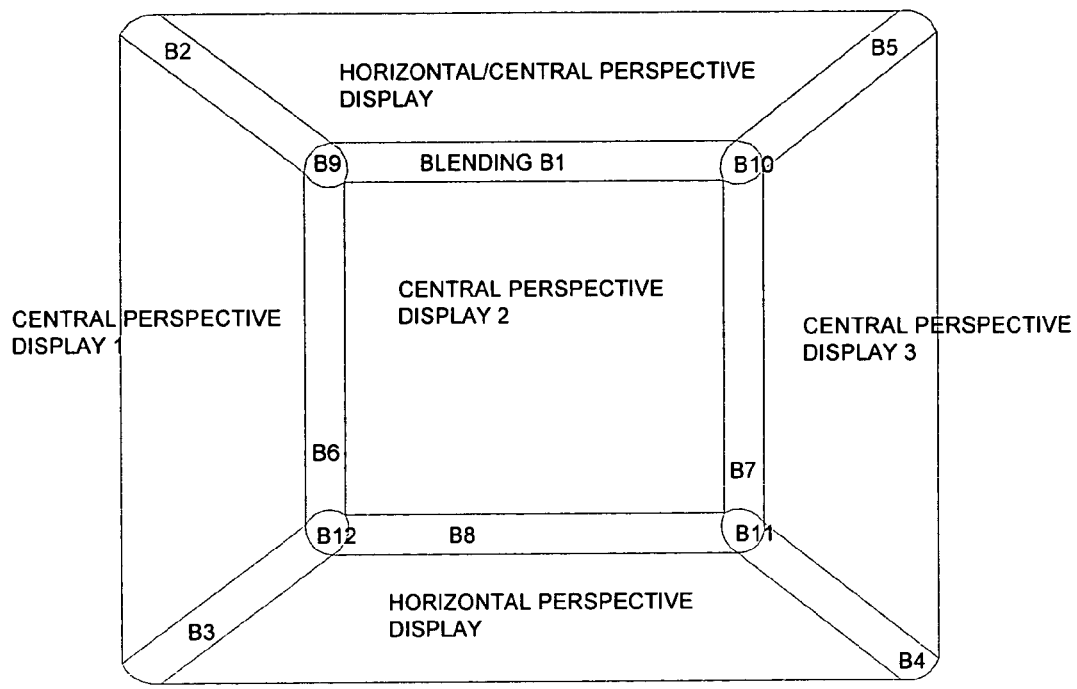
FIG. 14 shows multiple display surfaces together with multiple curvilinear blending sections.

Furthermore, the multi-plane display system can comprise multiple display surfaces together with multiple curvilinear blending sections as shown in FIG. 14. The multiple display surfaces can be a flat wall, multiple adjacent flat walls, a dome, and a curved wraparound panel.

The present invention multi-plane display system thus can simultaneously projecting a plurality of three dimensional images onto multiple display surfaces, one of which is a horizontal perspective image. Further, it can be a stereoscopic multiple display system allowing viewers to use their stereoscopic vision for three dimensional image presentation.

Since the multi-plane display system comprises at least two display surfaces, various requirements need to be addressed to ensure high fidelity in the three dimensional image projection. The display requirements are typically geometric accuracy, to ensure that objects and features of the image to be correctly positioned, edge match accuracy, to ensure continuity between display surfaces, no blending variation, to ensure no variation in luminance in the blending section of various display surfaces, and field of view, to ensure a continuous image from the eyepoint of the viewer.

Since the blending section of the multi-plane display system is preferably a curve surface, some distortion correction could be applied in order for the image projected onto the blending section surface to appear correct to the viewer. There are various solutions for providing distortion correction to a display system such as using a test pattern image, designing the image projection system for the specific curved blending display section, using special video hardware, utilizing a piecewise-linear approximation for the curved blending section. Still another distortion correction solution for the curve surface projection is to automatically computes image distortion correction for any given position of the viewer eyepoint and the projector.

Since the multi-plane display system comprises more than one display surface, care should be taken to minimize the seams and gaps between the edges of the respective displays. To avoid seams or gaps problem, there could be at least two image generators generating adjacent overlapped portions of an image. The overlapped image is calculated by an image processor to ensure that the projected pixels in the overlapped areas are adjusted to form the proper displayed images. Other solutions are to control the degree of intensity reduction in the overlapping to create a smooth transition from the image of one display surface to the next.

What is claimed is:

1. A display system comprising:
   a non-horizontal first display surface;
   a horizontal distinct second display surface;
   a non-horizontal distinct third display surface connecting the first display surface and second display surface;
   an input device; and
   one or more processors operable to interact with the input device, the first display surface, and the second display surface to perform operations comprising:
   performing a first projection of each point of a first 3D object onto a non-horizontal first drawing plane to generate a first projection image in a non-horizontal first perspective for the first display surface, the first projection performed by determining a first set of projection lines that extend through a first eyepoint, the first 3D object, and the first drawing plane, wherein the first drawing plane and the first display surface are mapped to one another and share a common reference plane;
   performing a distinct second projection of each point of a second 3D object onto a horizontal distinct second drawing plane to generate a distinct second projection image in a horizontal distinct second perspective for the second display surface, the second projection performed by determining a second set of projection lines that extend through a second eyepoint, the second 3D object, and the second drawing plane, wherein the second drawing plane and the second display surface are mapped to one another and share a common reference plane;
   performing a distinct third projection of each point of the second 3D object onto a non-horizontal distinct third drawing plane to generate a distinct third projection image in a non-horizontal third perspective for the third display surface, the third projection performed by determining a third set of projection lines that extend through a third eyepoint, the second 3D object, and the third drawing plane, wherein the third drawing plane and the third display surface are mapped to one another and share a common reference plane; and
   displaying the first projection image on the first display surface, concurrently displaying the second projection image on the second display surface, and concurrently displaying the third projection image on the third display surface.

2. The system of claim 1 where the first eyepoint and the second eyepoint are the same.

3. The system of claim 1 where the first display surface has a substantially vertical orientation.

4. The system of claim 1 where at least one of the first set of projection lines is perpendicular to the first drawing plane.

5. The system of claim 1 where the first and second eyepoints are distinct.

6. The system of claim 1 where an object point lies between a corresponding eyepoint and a corresponding drawing plane.

7. The system of claim 1 where at least one of the first drawing plane and the second drawing plane lies between a corresponding eyepoint and a corresponding object point.

8. The system of claim 1, where the processor is further operable to perform operations comprising:
   displaying the first image on the first display surface and concurrently displaying the second image on the second display surface.

9. The system of claim 1, where the processor is further operable to perform operations comprising:
   displaying the first image on the first display surface and displaying the third image on the second display surface.

10. The system of claim 1, where the processor is further operable to perform operations comprising:
    displaying the third image on the second display surface concurrent with displaying the second image on the second display surface.

11. The system of claim 1, where the first and second eyepoints are the same.

12. The system of claim 1, where the third eyepoint is offset from the second eyepoint.

13. The system of claim 1, where the first display surface has a substantially vertical orientation.

14. The system of claim 13 where at least one of the first set of projection lines is perpendicular to the first drawing plane.

15. The system of claim 1, wherein the first and second 3D objects are the same object.

16. The system of claim 1, wherein the first perspective is a substantially central perspective.

17. A computer-implemented method comprising:
    performing, by a processor, a first projection of each point of a first 3D object onto a non-horizontal first drawing plane to generate a first projection image in a non-horizontal first perspective for a non-horizontal first display surface, the first projection performed by determining a first set of projection lines that extend through a first eyepoint, the first 3D object, and the first drawing plane, wherein the first drawing plane and the first display surface are mapped to one another and share a common reference plane;

performing, by a processor, a distinct second projection of each point of a second 3D object onto a horizontal distinct second drawing plane to generate a distinct second projection image in a horizontal distinct second perspective for a horizontal second display surface, the second projection performed by determining a second set of projection lines that extend through a second eyepoint, the second 3D object, and the second drawing plane, wherein the second drawing plane and the second display surface are mapped to one another and share a common reference plane;

performing, by a processor, a distinct projection of each point of the second 3D object onto a distinct third drawing plane to generate a distinct third projection image for a third display surface connecting the first display surface and second display surface, the third projection performed by determining a third set of projection lines that extend through a distinct third eyepoint, the second 3D object, and the third drawing plane, wherein the third drawing plane and the third display surface are mapped to one another and share a common reference plane; and displaying the first projection image on the non-horizontal first display surface, concurrently displaying the horizontal second projection image on the second display surface, and concurrently displaying the third projection image on the third display surface.

18. A computer-implemented method comprising:

performing, by a processor, a first projection of each point of a first 3D object onto a non-horizontal first drawing plane to generate a non-horizontal first projection image in a first perspective for a non-horizontal first display surface, the first projection performed by determining a first set of projection lines that extend through a first eyepoint, the first 3D object, and the first drawing plane, wherein the first drawing plane and the first display surface are substantially coincident;

performing, by a processor, a distinct second projection of each point of a second 3D object onto a horizontal distinct second drawing plane to generate a horizontal distinct second projection image in a distinct second perspective for a horizontal second display surface, the second projection performed by determining a second set of projection lines that extend through a second eyepoint, the second 3D object, and the second drawing plane, wherein the second drawing plane and the second display surface are mapped to one another and share a common reference plane;

generating at least one distinct third projection image portion in at least one distinct third perspective for a curvilinear distinct third display surface connecting the first display surface and second display surface; and concurrently displaying the first projection image on the first display surface, the second projection image on the second display surface, and the third projection image on the third display surface.

* * * * *